(12) United States Patent
Stanford (10) Patent No.: US 10,760,598 B2
(45) Date of Patent: Sep. 1, 2020

(54) HYBRID SPRING FOR A HYDRAULIC CYLINDER

(71) Applicant: Enerpac Tool Group Corp., Menomonee Falls, WI (US)

(72) Inventor: Frantz Stanford, Monona, WI (US)

(73) Assignee: Enerpac Tool Group Corp., Menomonee Falls, WI (US)

(*) Notice: Subject to any disclaimer, the term of this patent is extended or adjusted under 35 U.S.C. 154(b) by 19 days.

(21) Appl. No.: 16/117,573

(22) Filed: Aug. 30, 2018

(65) Prior Publication Data

US 2019/0072117 A1    Mar. 7, 2019

Related U.S. Application Data (60) Provisional application No. 62/553,338, filed on Sep. 1, 2017.

(51) Int. Cl.
  *F15B 15/14* (2006.01)
  *F16F 9/32* (2006.01)
  *F16F 9/36* (2006.01)

(52) U.S. Cl.
  CPC ...... *F15B 15/1447* (2013.01); *F15B 15/1476* (2013.01); *F16F 9/3221* (2013.01);
  (Continued)

(58) Field of Classification Search
  CPC .................. F15B 15/1476; F15B 2211/7502
  See application file for complete search history.

(56) References Cited

U.S. PATENT DOCUMENTS 2,975,762 A * 3/1961 Blatt ............... B21D 37/10
                                                    92/114
3,049,359 A   8/1962 Geyer
(Continued)

FOREIGN PATENT DOCUMENTS

CN    2246205 Y *  1/1997
CN    2246205 Y    1/1997
(Continued)

OTHER PUBLICATIONS

English Translation of CN 2246205 Y to Zhiqiang. Jan. 29, 1997 (Year: 1997).*

(Continued)

*Primary Examiner* — Thomas E Lazo
(74) *Attorney, Agent, or Firm* — Michael Best & Friedrich LLP (57) ABSTRACT

A piston cylinder assembly includes a housing defining a housing cavity, a piston movably supported by the housing, and a spring return assembly connected between the housing and the piston. A fluid supplied to the housing cavity is operable to cause the piston to extend out of the housing and the spring return assembly is operable to cause the piston to retract into the housing. The spring return assembly includes a first spring member connected at one end to the housing and having an opposite end. The first spring member is operable to apply a first spring force. A second spring member is connected at one end to the piston and has an opposite end. The second spring member is operable to apply a second spring force. The opposite end of each of the first second spring members cooperate to apply the first and second spring forces in series.

20 Claims, 6 Drawing Sheets

(52) U.S. Cl.
CPC ... *F15B 15/1457* (2013.01); *F15B 2211/7052* (2013.01); *F16F 9/36* (2013.01)

(56) References Cited

U.S. PATENT DOCUMENTS

| | | | |
|---|---|---|---|
| 3,393,921 A | 7/1968 | Wilkins et al. | |
| 3,399,879 A * | 9/1968 | Hojo | F16F 3/04 |
| | | | 267/178 |
| 3,603,610 A | 9/1971 | Thompson | |
| 3,759,503 A | 9/1973 | Moore | |
| 3,864,922 A | 2/1975 | Dial et al. | |
| 4,245,826 A | 1/1981 | Wirges | |
| 4,328,960 A | 5/1982 | Handke et al. | |
| 4,406,473 A | 9/1983 | Sexton | |
| 4,478,431 A | 10/1984 | Muller et al. | |
| 4,564,048 A | 1/1986 | Taylor | |
| 4,635,765 A | 1/1987 | Schmidt | |
| 4,653,736 A * | 3/1987 | Pontoppidan | A61G 5/14 |
| | | | 267/168 |
| 4,657,230 A | 4/1987 | Weseloh | |
| 4,660,250 A | 4/1987 | Tillman et al. | |
| 4,719,683 A | 1/1988 | Ulbing | |
| 4,733,436 A | 3/1988 | Dochnahl | |
| 4,944,531 A | 7/1990 | Knabel et al. | |
| 4,948,171 A | 8/1990 | Knabel et al. | |
| 4,972,819 A * | 11/1990 | Engfer | F02D 11/08 |
| | | | 123/370 |
| 5,020,752 A | 6/1991 | Rizzi et al. | |
| 5,184,703 A | 2/1993 | Van Zeggeren | |
| 5,211,379 A | 5/1993 | Porter | |
| 5,263,695 A | 11/1993 | Bianchi | |
| 5,429,217 A | 7/1995 | Stringer et al. | |
| 5,542,509 A | 8/1996 | Bell | |
| 5,549,182 A | 8/1996 | Ehrnsberger et al. | |
| 5,560,456 A | 10/1996 | Koch et al. | |
| 6,032,961 A | 3/2000 | Pradel et al. | |
| 6,126,154 A | 10/2000 | Shepherd | |
| 6,237,904 B1 | 5/2001 | Shepherd | |
| 6,279,765 B1 | 8/2001 | Monaco | |
| 6,443,272 B1 | 9/2002 | Rottenberger et al. | |
| 6,491,292 B2 | 12/2002 | Stumm et al. | |
| 7,677,539 B2 | 3/2010 | Adoline | |
| 2009/0302559 A1 | 12/2009 | Doerfel | |
| 2010/0123276 A1 | 5/2010 | Adoline | |
| 2011/0291338 A1 | 12/2011 | Pepka | |
| 2012/0286462 A1 | 11/2012 | Pepka | |

FOREIGN PATENT DOCUMENTS

| | | |
|---|---|---|
| DE | 4039816 C1 | 4/1992 |
| DE | 4208887 A1 | 9/1993 |
| GB | 681416 A | 10/1952 |
| WO | 8705660 A1 | 9/1987 |

OTHER PUBLICATIONS

Search Report issued by the European Patent Office for relaated Application No. 18191638.8 dated Feb. 4, 2019 (11 pages).

\* cited by examiner

HYBRID SPRING FOR A HYDRAULIC CYLINDER

CROSS-REFERENCE TO RELATED APPLICATION

This application claims priority to U.S. Provisional Patent Application No. 62/553,338, filed Sep. 1, 2017, the entire contents of which are incorporated herein by reference.

FIELD

The present invention relates to a hydraulic cylinder assembly and, more specifically, to a spring arrangement for use in a single-action hydraulic cylinder assembly.

SUMMARY

In one independent aspect, a piston cylinder assembly may generally include a housing defining a housing cavity; a piston movably supported by the housing, fluid supplied to the housing cavity applying a fluid force to cause the piston to extend out of the housing; and a spring return assembly connected between the housing and the piston and operable to apply a spring force to cause the piston to retract into the housing. The spring return assembly may include a first spring member connected at one end to the housing and having an opposite end, the first spring member being operable to apply a first spring force, and a second spring member connected at one end to the piston and having an opposite end, the second spring member being operable to apply a second spring force, the opposite end of each of the first spring member and the second spring member cooperating to apply the first spring force and the second spring force in series.

In another independent aspect, a spring return assembly for a piston cylinder assembly may be provided. The piston cylinder assembly may include a housing defining a housing cavity, and a piston movably supported by the housing, fluid supplied to the housing cavity applying a fluid force to cause the piston to extend out of the housing The spring return assembly may generally include a tension spring connectable at one end to the housing and having an opposite end, the tension spring being operable to apply a first spring force; and a compression spring connectable at one end to the piston and having an opposite end, the compression spring being operable to apply a second spring force, the opposite end of each of the tension spring and the compression spring cooperating to apply the first spring force and the second spring force in series to cause the piston to retract into the housing.

In yet another independent aspect, a method of operating a piston cylinder assembly may be provided. The piston cylinder assembly may include a housing defining a housing cavity, a piston movably supported by the housing, and a spring return assembly including a tension spring connected at one end to the housing, the tension spring being operable to apply a first spring force, and a compression spring connected at one end to the piston, the compression spring being operable to apply a second spring force. The method may generally include supplying fluid to the housing cavity to apply a fluid force to the piston to extend the piston out of the housing; applying a spring return force to the piston, the spring return force including the first spring force and the second spring force in series; and, when the spring return force of the spring return assembly is greater than the fluid force, retracting the piston into the housing.

Other independent aspects of the invention may become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a spring return of a piston-cylinder assembly. The spring return applies a non-constant spring rate over a cycle in order to provide a greater spring force.

FIGS. 1-5 illustrate a piston and cylinder assembly 10 including a spring return assembly 12, a cylinder or housing 14 and a piston or plunger 18. The plunger 18 is movable relative to the housing 14. The assembly 10 is a single-acting hydraulic cylinder in which hydraulic fluid moves the plunger 18 in only a first direction. Once the plunger 18 is extended, the spring return assembly 12 retracts the plunger 18 in a second direction opposite the first direction. The illustrated spring return assembly 12 generally applies a non-constant spring rate over a cycle in order to provide a relatively greater spring force.

In the illustrated embodiment, the housing 14 is cylindrical in shape. The housing 14 includes an upper end surface 22, a lower end surface 26, and a side wall 30 extending between the surfaces 22, 26. The upper surface 22 defines an opening 34 to a housing cavity 38. The housing cavity 38 extends substantially through the length of the housing 14 along a housing axis 40 parallel to the side wall 30.

The housing cavity 38 is defined by an internal surface 42 of the side wall 30. A stop ring 46 is fixed in the opening 34 to the internal housing surface 42 and has an opening 48. In the illustrated embodiment, a first or outer ring surface 50 is flush with the upper housing surface 22. In other embodiments (not shown), the outer ring surface 50 may be above or below the surface 22. A second or inner ring surface 51 is opposite the stop outer ring surface 50.

The housing defines a fluid or pressure port 52 (e.g., through the side wall 30). The pressure port 52 is proximate the lower housing surface 26. The pressure port 52 provides fluid communication between a reservoir storing an incompressible, hydraulic fluid (not shown) and the housing cavity 38.

In the illustrated embodiment, the plunger 18 is also cylindrical and is movably housed in the cavity 38 to extend out of and retract into the housing 14. In the illustrated embodiment, an outer diameter of the plunger 18 is approximately equal to the diameter of the opening 48 in the stop ring 46. The plunger 18 includes an upper plunger surface 54, a lower plunger surface 58 and a plunger side wall 62 extending between the surfaces 54, 58. In the illustrated embodiment, the lower plunger surface 58 defines a plunger opening 66 into a plunger cavity 70. The illustrated plunger cavity 70 extends substantially the length of the plunger 18 along a plunger axis 74 parallel to the housing axis 40.

The plunger 18 includes a flange 71 extending radially from the plunger side wall 62. A lower flange surface provides the lower plunger surface 58, and an upper flange surface 73 is opposite the lower plunger surface 58. A diameter of the flange 71 is approximately equal to an inner diameter of the housing cavity 38. This allows the plunger 18 to move within the housing cavity 38 but helps to prevent hydraulic fluid in the housing cavity 38 from moving past the flange 71. The diameter of the flange 71 is greater than the inner diameter of the stop ring 46 to limit movement of the plunger 18 from the housing 14.

A support rod 78 is connected to the plunger 18 and extends along the plunger axis 74 at least partially through the plunger cavity 70. The support rod 78 is connected at one end to the plunger 18 by a first securing member 82 (e.g., a bolt, a screw, or any similar fastening member). A flange 86 is connected to the other end of the support rod 78 by a second securing member 90 (e.g., a bolt, a screw, or any similar fastening member). The support rod 78 and the flange 86 are thus fixed within the plunger cavity 70 relative to the plunger 18.

A sliding member 94 is movably supported on the support rod 78. The sliding member 94 has an inner diameter approximately equal to the diameter of the support rod 78 so that the sliding member 94 is supported for movement along the support rod 78. The outer diameter of the support rod 78 is less that an inner diameter of the plunger cavity 70.

The spring return assembly 12 is connected between the housing 14 and the piston 18 to apply a return force on the piston 18. The illustrated assembly 12 includes at least two biasing members: a tension member (e.g., a tension spring 102) and a compression member (e.g., one or more compression springs 106, 110). The illustrated springs 102, 106, 110 are connected in series between the housing 14 and the piston 18.

In other constructions (not shown), the assembly 12 may include more or fewer than the illustrated number of springs 102, 106, 110. Also, the springs 102, 106, 110, etc. may be arranged in a different manner (not shown).

In the illustrated construction, the springs 102, 106, 110 are concentric and wrap around the support rod 78. The tension spring 102 is secured at one end to the housing 14 (e.g., to the housing internal surface 46 by an insert 114).

The insert 114 is secured to the housing 14 by a third securing member 118 (e.g., a bolt, a screw, or any similar fastening member), and the tension spring 102 threads onto the outer surface of the insert 114. At the other end, the tension spring 102 is secured to the sliding member 94 (e.g., threaded onto the outer surface of the sliding member 94). An outer diameter of the tension spring is approximately equal to the inner diameter of the plunger cavity 70.

The compression member (the compression springs 106, 110) is positioned between the flange 86, at one end, and the sliding member 94, at the other, and within the tension spring 102. In the illustrated construction, one compression spring 110 is positioned within the other compression spring 106. The inner diameter of the inner spring 110 is larger than the diameter of the support rod 78 to allow relative movement between the compression member and the support rod 78. The outer diameter of the outer spring 106 (and of the other diameter of the flange 86) is smaller than the inner diameter of the tension spring 102 to allow relative movement between the springs 102, 106 (and between the spring 102 and the flange 86).

The first compression spring 106 and the second compression spring 110 have a first spring constant and a second spring constant, respectively, and are in parallel with each other. This means that the first compression spring 106 and the second compression spring 110 deflect the same amount when a force is applied to the spring return assembly 12. The tension spring 102 has a third spring constant and is in series with the compressions spring 106, 110. This arrangement of springs 102, 106, 110 creates a hybrid spring.

The first spring constant and the second spring constant can form an equivalent spring constant. In the illustrated embodiment, the equivalent spring constant is greater than the third spring constant and can be used to represent an equivalent compression spring in series with the tension spring 102. The tension spring 102 experiences the same force as the equivalent compression spring when a force is applied to the spring return assembly 12.

Figure 1:
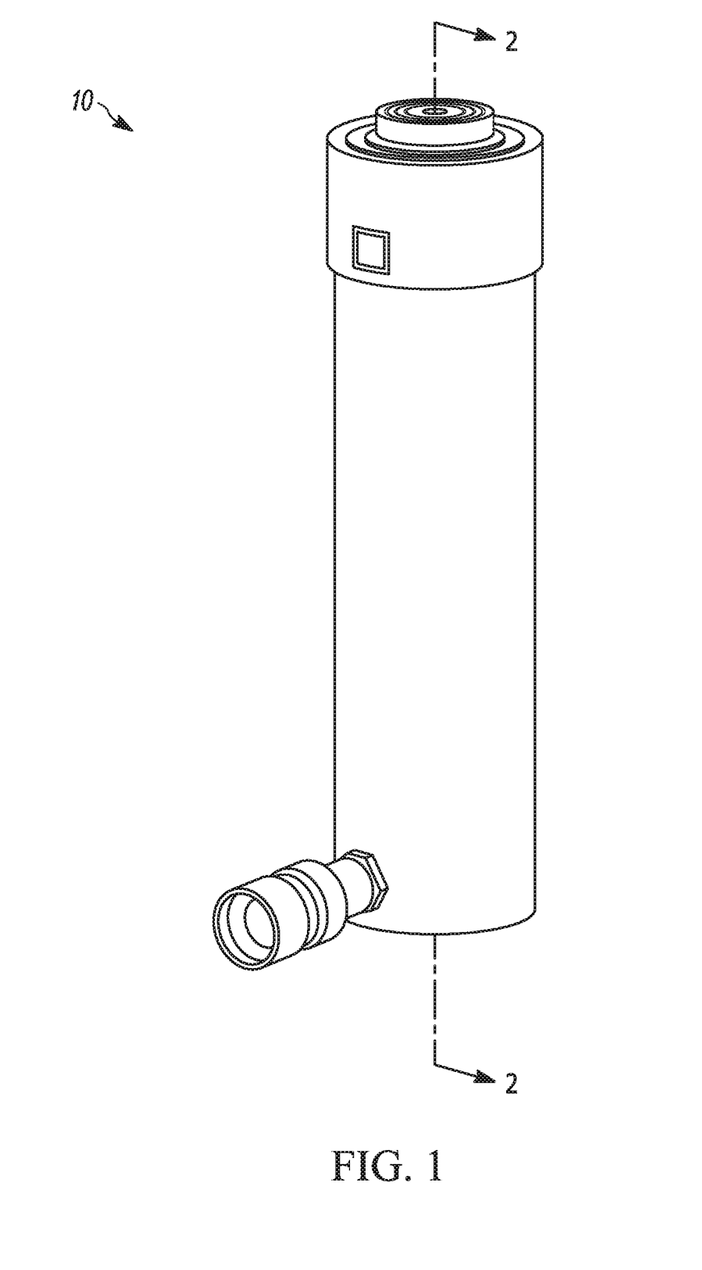
FIG. 1 is a perspective view of a piston and cylinder assembly.
Figure 2:
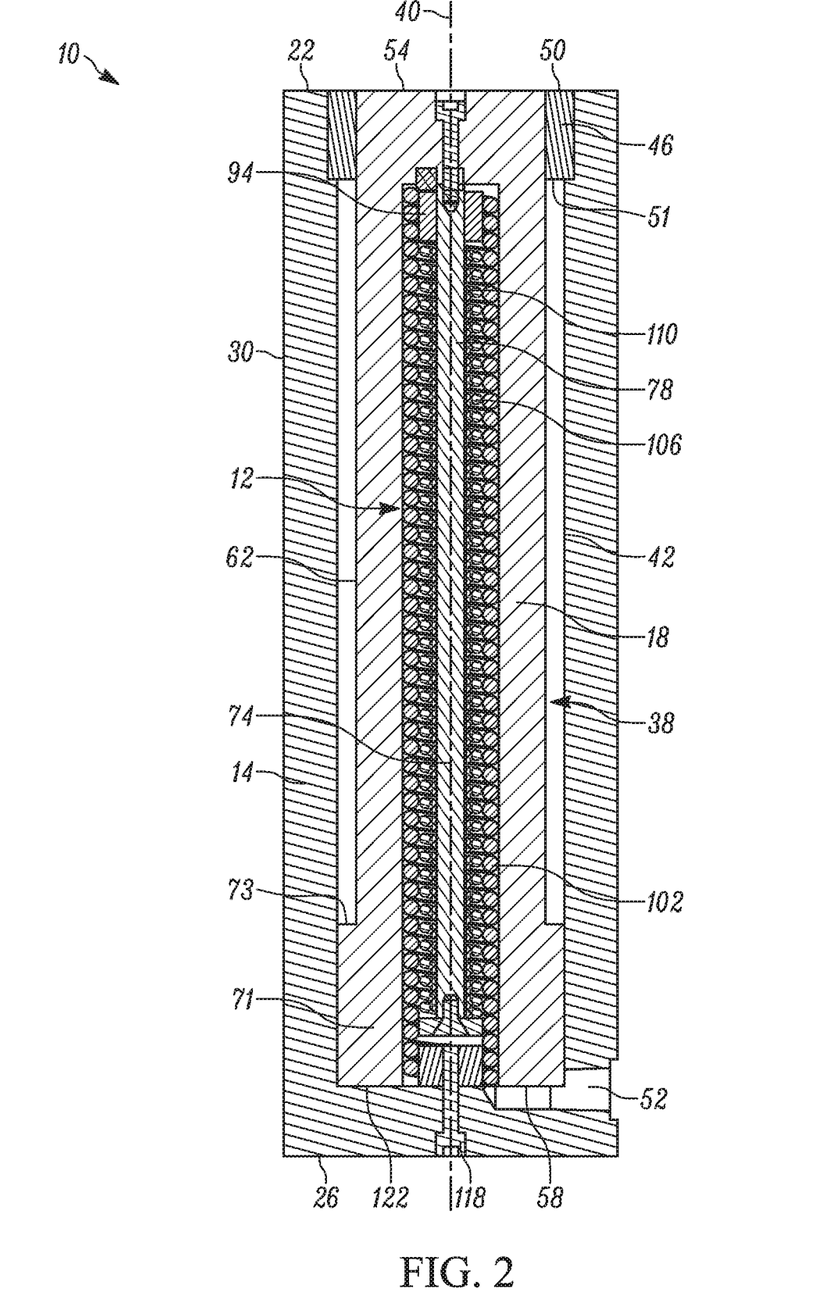
FIG. 2 is a cross-sectional view of the assembly taken generally along line 2-2 in FIG. 1, illustrating the assembly in a retracted position.

FIGS. 2-5 illustrate extension of the plunger 18 relative to the housing 14 during a stroke cycle. FIG. 2 illustrates the assembly 10 in a retracted position, the initial and final positions of the stroke cycle. In the illustrated retracted position, the upper plunger surface 54 is flush with the upper housing surface 22, and the lower plunger surface 58 is in contact with a lower cavity surface 122. The spring return assembly 12 (e.g., the tension spring 102 and the compression spring(s) 106, 110) is in an initial position.

To move from the retracted position toward the extended position, hydraulic fluid is supplied through the pressure port 52 into the housing cavity 38 and provides a fluid force against the lower plunger surface 58. When the fluid force exceeds the force of the spring return assembly 12, the plunger 18 begins to extend out of the housing cavity 38.

Figure 3:
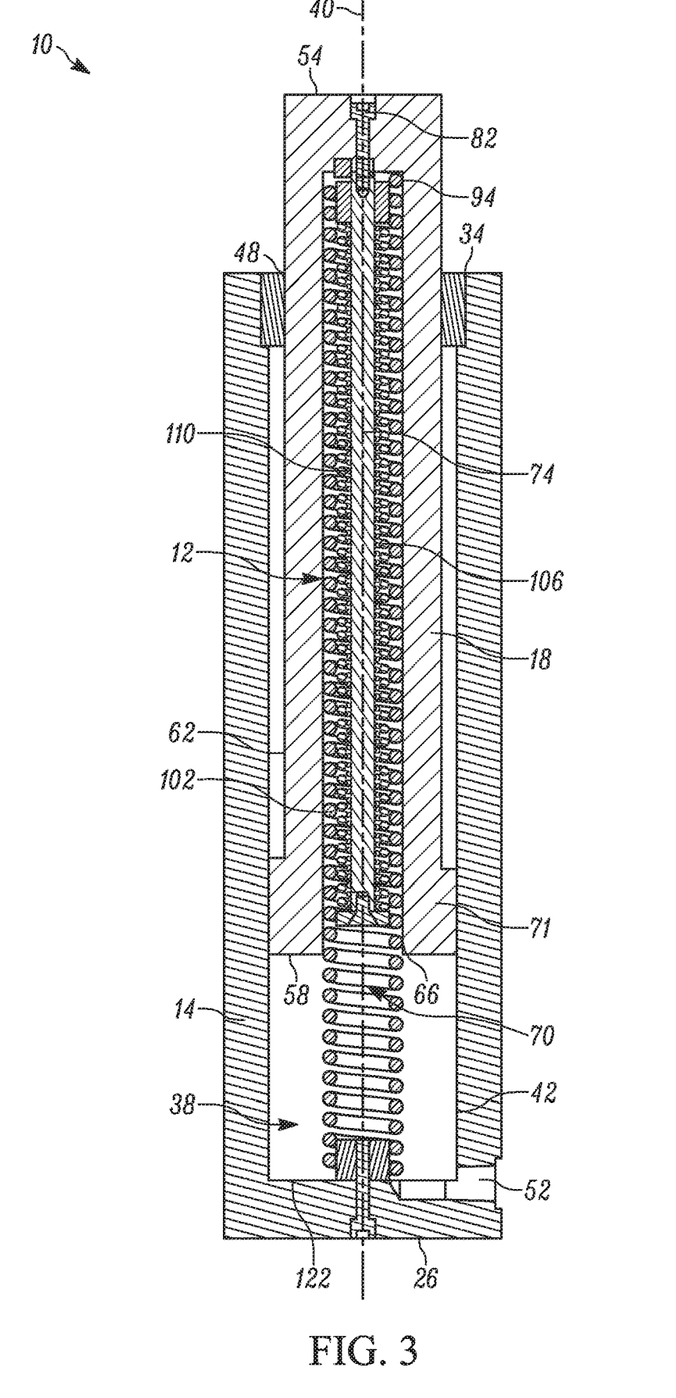
FIG. 3 is another cross-sectional view of the assembly, illustrating the assembly in an initial extended position.

FIG. 3 illustrates the assembly 10 in an initial extended position. In this position, the plunger 18 has begun to extend out of the housing cavity 38 so that the upper plunger surface 54 is no longer flush with the upper housing surface 22 and the lower plunger surface 58 moves out of contact with the lower housing surface 22.

As the plunger 18 moves to the initial extended position, the tension spring 102 stretches along the plunger axis 74 to a length longer than a length of the housing 14. In the illustrated spring return assembly 12, the tension spring 102 is the only spring that deflects. Because the spring constant of the tension spring 102 is less than the equivalent compression spring constant, the tension spring 102 deflects before the compression spring(s) 106, 110.

In alternative embodiments (not shown), the tension spring 102 may have a spring constant that is greater than the equivalent compression spring constant. In such a case, the tension spring 102 would not be the first spring to move.

Figure 4:
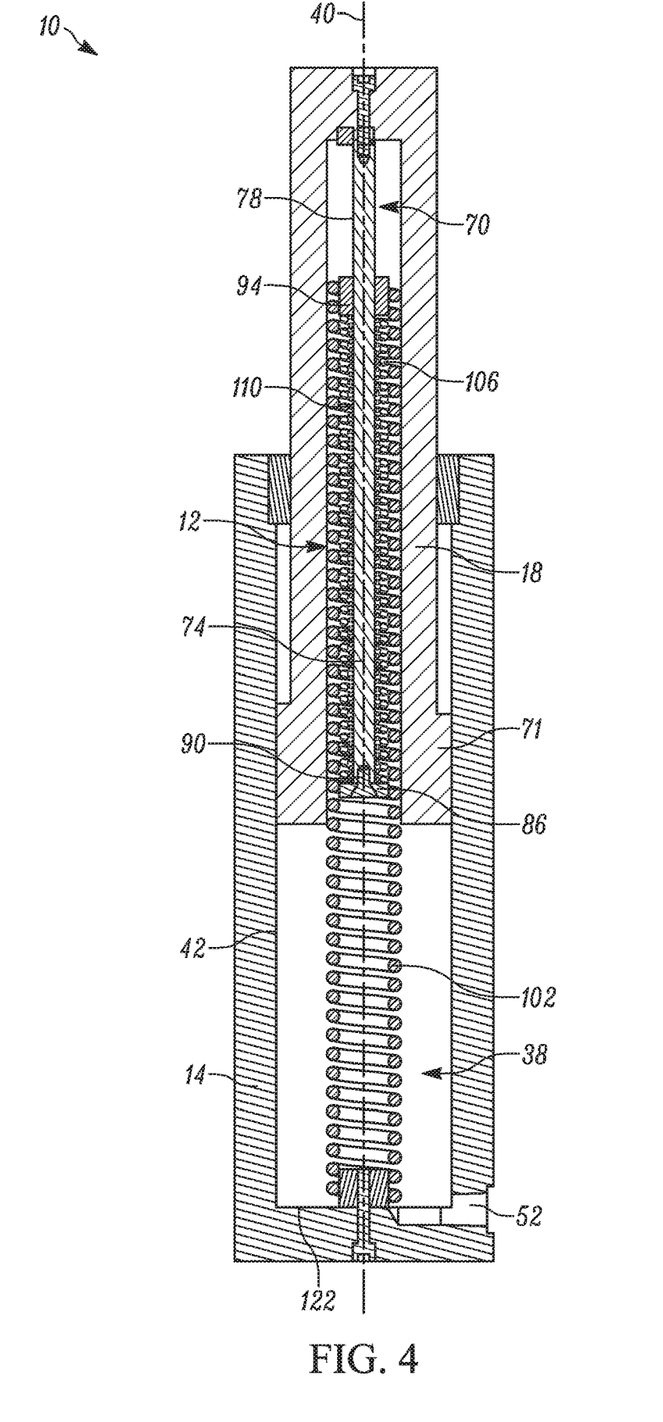
FIG. 4 is another cross-sectional view of the assembly, illustrating the assembly in a further extended position.

As additional hydraulic fluid force is applied to the plunger 18, the plunger 18 extends further from the housing 14. FIG. 4 illustrates the assembly 10 in a further extended position. In this position, the tension spring 102 continues to deflect along the plunger axis 74. Also, the fluid force is great enough that the compression spring(s) 106, 110 begin to be compressed. As the compression spring(s) 106, 110 begin to compress, the sliding member 94 moves along the support rod 78 towards the flange 86.

Figure 6:
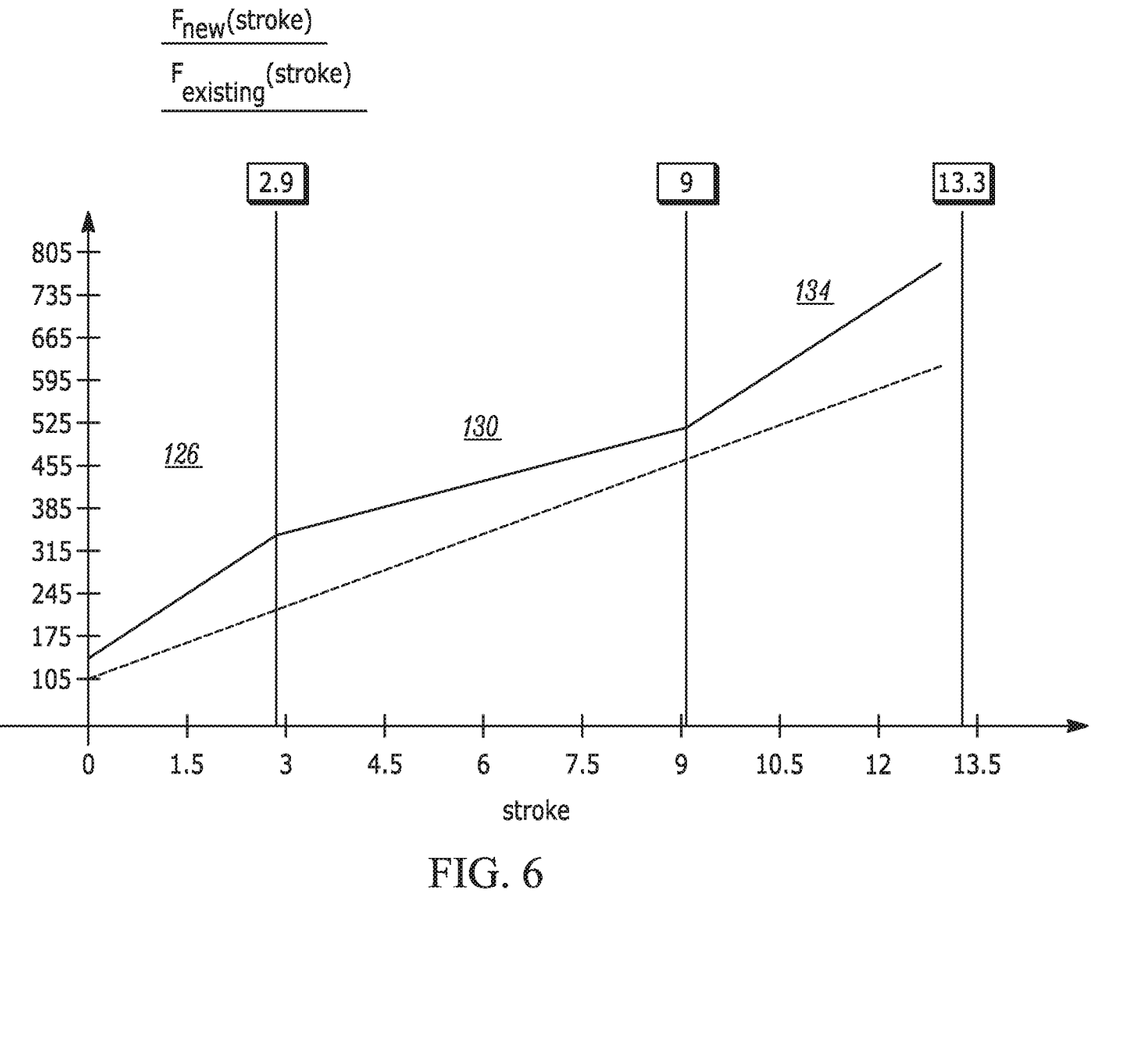
FIG. 6 is a graph comparing a spring force over a plunger stroke for an existing piston and cylinder assembly and the assembly of FIG. 1.

By utilizing a tension spring 102 in series with compression spring(s) 106, 110 in the current configuration of a hybrid spring, the spring force in the spring return assembly 12 becomes non-linear. As shown in FIG. 6, the slope of the $F_{new}$ line, representing spring force over plunger stroke, is shallower from the initial extended position to the further extended position than from the retracted position to the initial extended position. This is because, as the compression spring(s) 106, 110 deflect, they reduce the amount deflection of the tension spring 102. However, the tension spring 102 still deflects at a greater rate than the compression spring(s) 106, 110.

Figure 5:
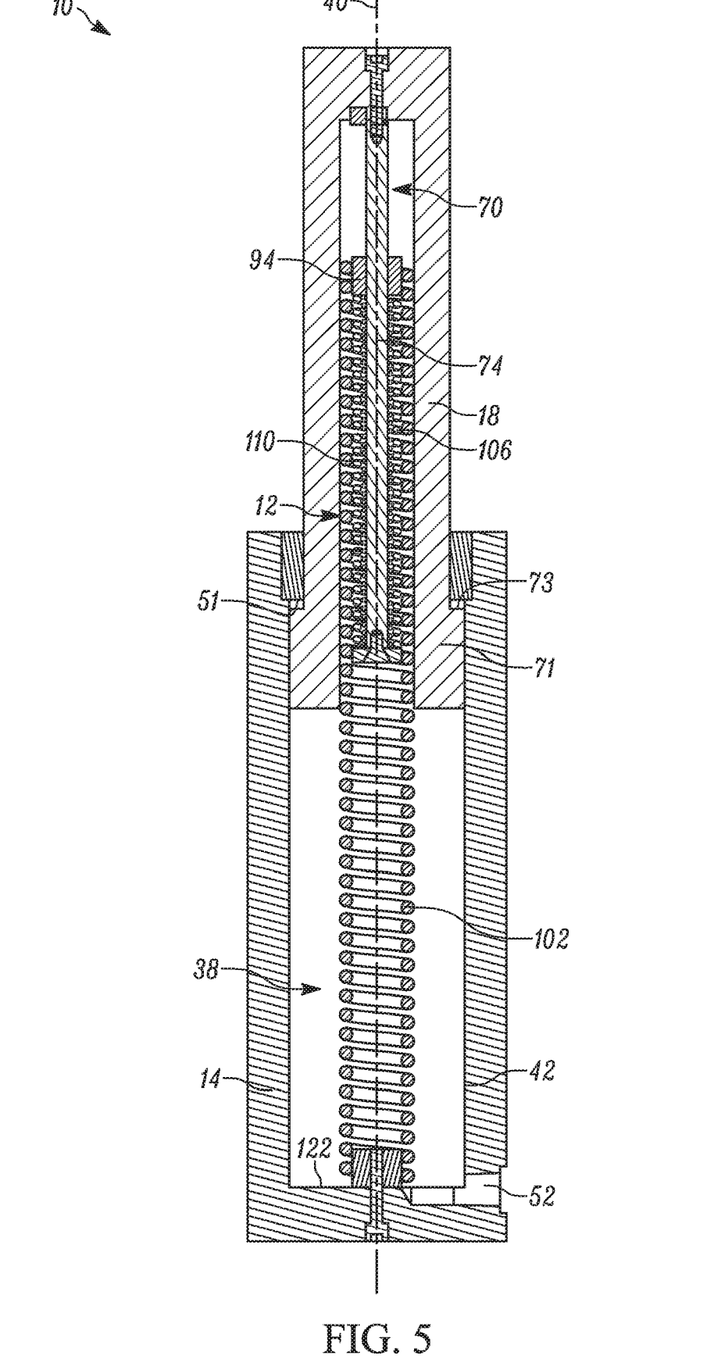
FIG. 5 is another cross-sectional view of the assembly, illustrating the assembly in a fully extended position.

As additional hydraulic fluid force is applied to the plunger 18, the plunger 18 extends further from the housing 14 to the fully extended position (see FIG. 5). In the fully extended position, the flange second surface 73 contacts the inner ring surface 51. Once the flange second surface 73 is in contact with the inner ring surface 51, the plunger 18 cannot extend further out of the housing cavity 38. In this position, the assembly 10 has completed one-half cycle, the extend portion of the cycle.

From the further extended position (FIG. 4) to the fully extended position, only the tension spring 102 deflects. The tension spring 102 deflected a length greater than the length of deflection of the compression spring(s) 106, 110. In alternative embodiments (not shown), the compression spring(s) 106, 110 can also deflect between the further extended position and the fully extended position.

To complete the stroke cycle, the assembly 10 returns to the retracted position (FIG. 2). Once the force of the spring return assembly 12 is greater than the hydraulic fluid force, the plunger 18 and the spring return assembly 12 will begin to return to the retracted positions (from FIG. 5 to FIG. 2). Initially, a component of the spring force supplied by the tension spring 102 will begin to retract the plunger 18 into the housing cavity 38. As this occurs, the flange first surface 72 will apply a force to the hydraulic fluid to force the hydraulic fluid out of the housing cavity 38 through the pressure port 52.

Once the assembly 10 reaches the further extended position (FIG. 4), the compression spring(s) 106, 110 begin to decompress, as the tension spring 102 continues to compress. The assembly 10 then moves to the initial extended position (FIG. 3), and, in this position, the compression spring(s) 106, 110 have returned to their initial position. The tension spring 102 continues to compress and force hydraulic fluid from the housing cavity 38. Once all of the hydraulic fluid has left the housing cavity 38, the plunger 18 and the spring return assembly 12 have returned to the retracted position (FIG. 2), and the stroke cycle is complete.

FIG. 6 is a graph of the spring force over plunger stroke for an existing spring return assembly ($F_{existing}$) and for the illustrated assembly 10 including the spring return assembly 12 ($F_{new}$). Generally, the force of the existing spring return assembly generally increases in a linear manner over the stroke length.

In comparison, between the retracted position and the initial extended position 126, the force of the spring return assembly 12 $F_{new}$ increases at a greater rate than that of $F_{existing}$. Once the compression spring(s) 106, 110 begin to deflect between the initial extended position and the further extended position 130, the slope of the force of the spring return assembly 12 $F_{new}$ is shallower than that of $F_{existing}$. From the further extended position 130 to the fully extended position 134, the slope of the force of the spring return assembly 12 $F_{new}$ returns to its original value, greater than that of $F_{existing}$.

In the illustrated configuration, the total force that the assembly 10 experiences and that the spring return assembly 12 applies is greater than the force in the existing design. This enables the plunger 18 to retract more quickly than the plunger in the existing design could.

By using one or more compression springs 106, 110 in series with a tension spring 102 in the assembly 10, less displacement of the springs 102, 106, 110 is required. Reducing the required spring displacement may allow for the use of springs 102, 106, 110 with larger and thicker coils; such springs 102, 106, 110 can withstand a greater force. The greater the force a spring experiences may generally translate to a shorter time for the springs 102, 106, 110 to return to an initial position.

Although aspects of the invention have been described in detail with reference to certain preferred constructions, variations and modifications exist within the scope and spirit of one or more independent aspects of the invention as described.

One or more independent features and/or independent advantages of the invention may be set forth in the following claims:

What is claimed is:

1. A piston cylinder assembly comprising:
   a housing defining a housing cavity;
   a piston movably supported by the housing, fluid supplied to the cavity applying a fluid force to cause the piston to extend out of the housing, the piston defining a piston cavity and including a support assembly within the piston cavity, the support assembly including a support rod connected at one end to the piston and having an opposite end, a flange supported on the opposite end, and a sliding member movable along the support rod; and
   a spring return assembly connected between the housing and the piston and operable to apply a spring force to cause the piston to retract into the housing, the spring return assembly including
      a first spring member connected at one end to the housing and having an opposite end, the first spring member being operable to apply a first spring force, and
      a second spring member connected at one end to the piston and having an opposite end, the second spring member being operable to apply a second spring force, the opposite end of each of the first spring member and the second spring member cooperating to apply the first spring force and the second spring force in series.

2. The piston cylinder assembly of claim 1, wherein the first spring member includes a tension spring.

3. The piston cylinder assembly of claim 2, wherein the second spring member includes a compression spring.

4. The piston cylinder assembly of claim 3, wherein the second spring member includes a pair of compression springs arranged in parallel.

5. The piston cylinder assembly of claim 4, wherein the compression springs have an equivalent spring constant greater than a spring constant of the tension spring.

6. The piston cylinder assembly of claim 1, wherein a spring constant of the second spring member is greater than a spring constant of the first spring member.

7. The piston cylinder assembly of claim 6, wherein the first spring member includes a tension spring, and the second spring member includes a compression spring.

8. The piston cylinder assembly of claim 1, wherein the opposite end of the first spring member is connected to the sliding member, and wherein the second spring member is positioned between the flange and the sliding member.

9. The piston cylinder assembly of claim 8, wherein the first spring member includes a tension spring, and wherein the second spring member includes a compression spring.

10. A spring return assembly for a piston cylinder assembly, the piston cylinder assembly including a housing defining a housing cavity, and a piston movably supported by the housing, fluid supplied to the housing cavity applying a fluid force to cause the piston to extend out of the housing, the spring return assembly comprising:
    a tension spring connectable at one end to the housing and having an opposite end, the tension spring being operable to apply a first spring force; and
    a first compression spring and a second compression spring arranged in parallel with the first compression spring, each of the first compression spring and the second compression spring being connectable at one end to the piston and having an opposite end, the first compression spring and the second compression spring being operable to apply a second spring force, the opposite end of each of the tension spring and of the first compression spring and the second compression spring cooperating to apply the first spring force and the second spring force in series to cause the piston to retract into the housing.

11. The spring return assembly of claim 10, wherein the first compression spring and the second compression spring are concentric.

12. The spring return assembly of claim 10, wherein an equivalent spring constant of the first compression spring and the second compression spring is greater than a spring constant of the tension spring.

13. The spring return assembly of claim 10, wherein the piston defines a piston cavity, and wherein the spring return assembly further comprises a support assembly positioned within the piston cavity, the support assembly including a support rod connected at one end to the piston and having an opposite end, a flange supported on the opposite end, and a sliding member movable along the support rod.

14. The spring return assembly of claim 13, wherein the opposite end of the tension spring is connected to the sliding member, and wherein the compression spring is positioned between the flange and the sliding member.

15. The spring return assembly of claim 10, wherein the spring return assembly is operable to apply a non-constant spring rate over a cycle of the piston.

16. A method of operating a piston cylinder assembly, the piston cylinder assembly including a housing defining a housing cavity, a piston movably supported by the housing, the piston defining a piston cavity and including a support assembly within the piston cavity, the support assembly including a support rod connected at one end to the piston and having an opposite end, a flange supported on the opposite end, and a sliding member movable along the support rod, and a spring return assembly including a tension spring connected at one end to the housing, the tension spring being operable to apply a first spring force, and a compression spring connected at one end to the piston, the compression spring being operable to apply a second spring force, the compression spring being connected between the flange and the sliding member, the method comprising:
    supplying fluid to the housing cavity to apply a fluid force to the piston to extend the piston out of the housing;
    moving the sliding member toward the flange and applying the second spring force;
    applying a spring return force to the piston, the spring return force including the first spring force and the second spring force in series; and
    when the spring return force of the spring return assembly is greater than the fluid force, retracting the piston into the housing.

17. The method of claim 16, further comprising:
    extending the piston to an initial extended position in which only the first spring force is applied to the piston; and
    extending the piston to a fully extended position in which the first spring force and the second spring force are applied to the piston.

18. A piston cylinder assembly comprising:
    a housing defining a housing cavity;
    a piston movably supported by the housing, fluid supplied to the cavity applying a fluid force to cause the piston to extend out of the housing; and
    a spring return assembly connected between the housing and the piston and operable to apply a spring force to cause the piston to retract into the housing, the spring return assembly including
        a first spring member connected at one end to the housing and having an opposite end, the first spring member being operable to apply a first spring force, and
        a second spring member connected at one end to the piston and having an opposite end, the second spring member including a pair of compression springs arranged in parallel and operable to apply a second spring force, the opposite end of each of the first spring member and the second spring member cooperating to apply the first spring force and the second spring force in series.

19. A spring return assembly for a piston cylinder assembly, the piston cylinder assembly including a housing defining a housing cavity, and a piston defining a piston cavity and movably supported by the housing, fluid supplied to the housing cavity applying a fluid force to cause the piston to extend out of the housing, the spring return assembly comprising:
    a support assembly positioned within the piston cavity, the support assembly including a support rod connected at one end to the piston and having an opposite end, a flange supported on the opposite end, and a sliding member movable along the support rod;
    a tension spring connectable at one end to the housing and having an opposite end, the tension spring being operable to apply a first spring force; and
    a compression spring connectable at one end to the piston and having an opposite end, the compression spring being operable to apply a second spring force, the opposite end of each of the tension spring and the compression spring cooperating to apply the first spring force and the second spring force in series to cause the piston to retract into the housing.

20. A method of operating a piston cylinder assembly, the piston cylinder assembly including a housing defining a housing cavity, a piston movably supported by the housing, and a spring return assembly including a tension spring connected at one end to the housing, the tension spring being operable to apply a first spring force, a first compression spring, and a second compression spring arranged in parallel with the first compression spring, each of the first compression spring and the second compression spring being connected at one end to the piston, the first compression spring and the second compression spring being operable to apply a second spring force, the method comprising:
- supplying fluid to the housing cavity to apply a fluid force to the piston to extend the piston out of the housing;
- applying a spring return force to the piston, the spring return force including the first spring force and the second spring force in series; and
- when the spring return force of the spring return assembly is greater than the fluid force, retracting the piston into the housing.

* * * * *